April 12, 1932.  J. B. ARMITAGE ET AL  1,853,795
TRANSMISSION AND CONTROL MECHANISM FOR MACHINE TOOLS
Filed Sept. 22, 1926
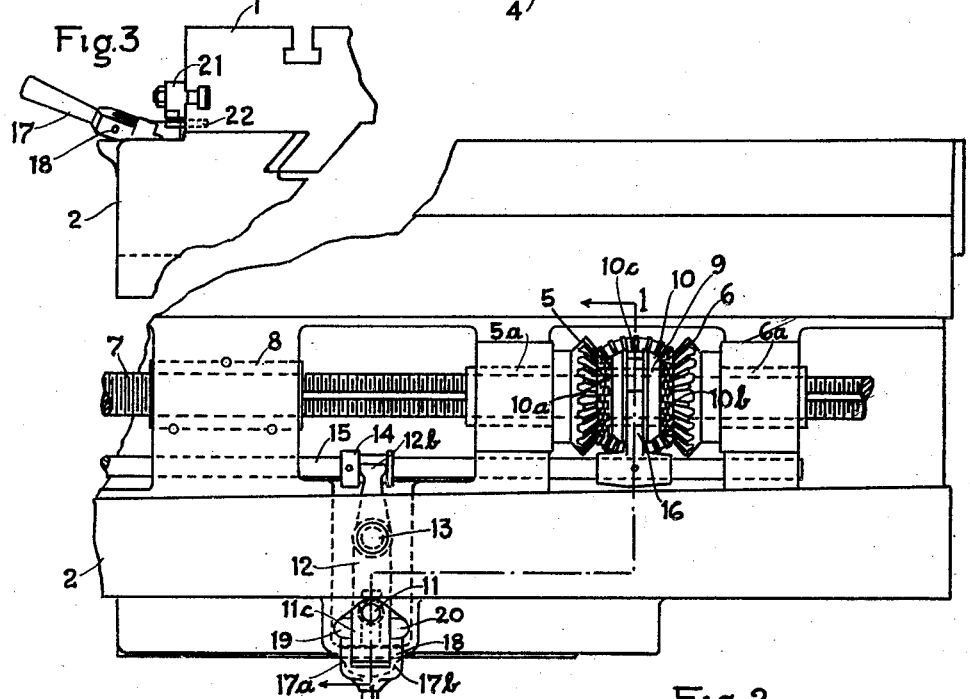

Patented Apr. 12, 1932

1,853,795

UNITED STATES PATENT OFFICE

JOSEPH B. ARMITAGE, OF MILWAUKEE, AND RALPH E. SAVING, OF WAUWATOSA, WISCONSIN, ASSIGNORS TO KEARNEY & TRECKER CORPORATION, OF WEST ALLIS, WISCONSIN

TRANSMISSION AND CONTROL MECHANISM FOR MACHINE TOOLS

Application filed September 22, 1926. Serial No. 136,933.

This invention relates more particularly to transmission and control mechanism for machine tools having a support movable by power.

The drive train for such a movable support is ordinarily clutch controlled by the means of clutch members shiftable into and out of driving engagement. Trip devices are ordinarily provided for shifting the clutch members, either by hand or at a predetermined point in the movement of the support, in the latter case usually by the means of dogs mounted upon the support, or their equivalent. As heretofore constructed, when the support train has been interrupted by such dogs, it may not be immediately re-engaged to cause support movement in the same direction because the parts which have contacted in the course of support movement, to shift the clutch member are still in contact and prevent the clutch member from being shifted back. Such operation of the parts is desirable for various reasons under most conditions of machine operation, but under certain conditions it is highly desirable that the clutch should be immediately re-engageable.

A main purpose of this invention is to provide a trip mechanism permitting immediate re-engagement of a clutch member previously shifted out of the same engagement by the trip mechanism.

Another purpose is to provide a trip mechanism which ordinarily operates in the usual manner to prevent clutch re-engagement as described above, but may, at the will of the operator be temporarily adjusted to permit immediate clutch re-engagement.

Another object is to provide a trip which is temporarily operable as described to permit immediate clutch re-engagement, only so long as the operator consciously determines such a condition of operation but which immediately resumes a condition preventing clutch re-engagement when the conscious attention of the operator is withdrawn.

Another object is to provide in combination with the trip means adjustable as described, other trip means invariably operable to interrupt the support drive train at a certain predetermined point of support movement and which invariably prevents clutch re-engagement which would permit the support to travel further in the same direction.

Another object is to provide means for interrupting the motion of a machine tool support at an intermediate point of its travel, in order that notice may be given to the operator, and time allowed for the operator to make certain adjustments, and to prevent damage to the machine, work or cutter.

Another object is to simplify and improve the construction and operation of transmission and control mechanism for a movable machine tool support and particularly for one of the movable supports of a milling machine.

The invention consists in the construction, arrangement and combination of parts as hereinafter particularly described and pointed out in the claims and in such modifications thereof as may be equivalent to the device claimed.

In the accompanying drawings, like reference characters designate the same parts in the several figures.

Fig. 1 is an end elevation, partly in section along line 1—1 of Fig. 2, of a movable machine tool table and a saddle or support therefor.

Fig. 2 is a partial plan view of the table support, the table being removed to more clearly show portions of the drive train and trip mechanism.

Fig. 3 is a partial end view showing some of the mechanism of Fig. 1 in a different relative position of adjustment.

Fig. 4 is a partial plan view showing some of the mechanism of Fig. 2 in a different position of adjustment.

Fig. 5 is a front view of a dog shown in Figs. 1, 3 and 4.

A table or work support 1 is slidably guided on a support or saddle 2 in the usual manner. Journaled in the support 2 is a bevel gear 3 which may be driven from any suitable power source by the means of a transmission train terminating in a bevel gear 4 fixed on the stem of gear 3. Bevel gear 3 engages with the bevel gears 5 and 6 to drive them in opposite directions the gears 5 and 6 being journaled in the saddle by means of stems 5a and 6a. A table screw 7 is rotatably supported from table 1 but is prevented from axial movement relative to the table in a manner which, being well known, is not shown in the drawings. Screw 7 is positioned to pass freely through suitable aligned bores in the gear stems 5a and 6a, and is in threaded engagement with a nut 8 fixed in saddle 2. Slidably keyed on feed screw 7 is a sleeve 9 fitted between opposed faces of the gears 5 and 6, and slidably keyed on sleeve 9 is a clutch member 10, provided on its opposite ends with clutch teeth 10a and 10b, respectively adapted for engagement with complementary clutch teeth on the faces of gears 5 or 6 when the clutch member is shifted in the one or the other direction.

By the construction described the table 1 may be caused to move in the one or the other direction by the means of power derived from gear 4, accordingly as clutch member 10 is shifted in the one or the other direction. The clutch member 10 has a central position in which it is not engaged to be driven from either bevel gear and when in such position the table movement will stop.

For shifting clutch member 10, the following mechanism is provided. A trip post 11 is pivoted adjacent an edge of table 1 and is provided with an arm 11a carrying a pin portion 11f projecting downward into a slot 12a in an arm of a lever 12 which is pivoted on a pin 13 fixed in the saddle. Another arm of lever 12 has a portion 12b engaging a groove in a spool 14 fixed on a rod 15 slidably supported in saddle 2. Rod 15 carries a fork 16 engaging an annular groove 10c in the clutch member 10. The trip post 11 has fixed upon its upper end a member 11c, loosely fitted between the parallel sides of a slotted space between arms 17a and 17b of a trip part 17, which is pivoted about a pin 18 carried by the member 11c. Thus trip part 17 may be turned, together with trip post 11 about the axis of trip post 11, and by the mechanism described the clutch member 10 will be shifted accordingly.

The arm portions 17a and 17b are respectively provided with contact portions 19 and 20 so disposed that when clutch member 10 is in its central position of non-engagement the portions 19 and 20 are equally distant from the edge of the table. When the clutch member is moved to engage in a direction to move the table to the right in Fig. 4, the contact portion 19 moves toward the table and the portion 20 away from the table, as shown in the full line position in Fig. 4. When the clutch member is moved to move the table to the left, the contact portion 20 moves toward the table as shown by the dotted line position of Fig. 4. A dog 21 is adjustably fixed on the edge of the table by the means of a T slot and T bolt in the usual manner, and when suitably positioned, during the course of table movement to the right in Fig. 4, a beveled portion 21a will contact with the portion 19 and force the contacted portion back to the position shown in Fig. 2, thereby moving clutch member 10 to a central position as shown in Fig. 2, and interrupting the table movement.

The above described dog action takes place if the trip part 17 is in the position about pivot pin 18 as shown in Fig. 1 to which the unbalanced weight of the overhanging hand grip portion 17c will normally move it, an under side of the part 17 then resting against the face of a suitable saddle portion 2a. As long as it remains in such position relative to pivot pin 18, after being moved by a dog to a position of non-engagement of clutch 10, the contact between the angular dog face and the portion 19 prevents the trip part from being returned to the same position of clutch engagement, although it may be shifted to the opposite position to cause the table to move in the opposite direction, but if the trip part is moved by the operator about the pivot pin 18 to the position shown in Fig. 3, then the contact portion of the trip part is lowered beneath the dog, and the trip part may be immediately moved to again engage the clutch member 10 to continue the movement of the table in the same direction as previously moving. A portion of trip part 17 is cut away at 17d, Fig. 1, to permit movement as described about pivot 18. The dog then moves past the trip post 11, the table movement being continued as far as is desired, except as will be later noted, and the dog is then to the right of the trip post. When it is desired to move the table back again, to the left the trip part 17 is shifted to the dotted position shown in Fig. 4. The portion 20 then stands in the path of movement of the dog as it moves backward. The lower face of the dog is beveled as particularly shown in Fig. 5, the bevel being such as to strike the top of the portion 20 during left hand table movement, and to force the portion 20 downward, pivoting about the pin 18 without movement of the post 11, thus permitting the dog to retreat past the post without disengaging the clutch 10.

For the left hand table movement a dog not shown, similar to dog 21 but of oppositely positioned bevels contacts the portion 20 to disengage the table drive during such movement, but forces the portion 19 downward to pass over it without movement of trip post 11 during right hand movement.

As previously noted it is sometimes very desirable to re-engage table movement in the same direction when it has been disengaged by one of the adjustable dogs. But to prevent the table movement being continued to a point where damage may result, other dogs are provided which are not adjustable, and which cannot be avoided by movement of trip part 17 about the pivot pin 18. Such a dog is illustrated for the right hand table movement. A thin dog 22 is permanently fixed with table 1 in a position underneath the space occupied by the adjustable dogs but so positioned that a beveled portion 22a will contact with the lever portion 19 just before the table reaches the limit of its right hand travel, after which the trip part will be forced by the dog to the position in which clutch member 10 is disengaged. A dog not shown, similar to the dog 22 is fixed with the table to contact with the portion 20 and disengage clutch member 10 just before the table reaches the limit of its left hand movement.

It will be seen that the trip part portions 19 and 20 each have movement about the axis of post 11 in an upper and a lower path according to the position of the trip part about the axis of pin 18, and may be positioned for movement in either path, either by the hand grip 17c or during the one direction of support movement by the beveled portion 21b of the dog 21. The movement in either path will effect the movement of clutch member 10, but the dog 21 is effective on the clutch member only when the trip parts are positioned in the one path although dog 22 is effective for either path.

From the foregoing description it will be seen that table movement may be established in either direction by manual movement of trip part 17, and during such movement a suitably positioned adjustable dog may automatically stop the table at any desired point, for instance, just before the work is contacted by the cutter, following which the table movement may be immediately manually re-engaged to continue in the same direction as far as desired, for instance while the cutter passes over the work piece. The table movement may then be reversed by the means of trip part 17 and the table traversed back to the starting point during which return movement the dog will pass the trip part 17 and trip post 11 without affecting the position of clutch 10. Such a cycle of machine movement is particularly desirable for instance when the table train includes a slow train for feeding the work past the cutter, and a fast train for executing other table movements. By the mechanism here shown, the table may be moved rapidly up to the position where the work almost contacts with the cutter, and without danger that the inattention of the operator will cause damage from contact of work and cutter at the rapid rate. The table movement being interrupted by the dog just before the work and cutter contact, may be established again after the table drive train has been adjusted to a rate suitable for cutting.

Having now fully explained the invention, what is claimed is:

1. In a machine tool the combination of a movable support, transmission mechanism therefor including a clutch member shiftable to engaged and to disengaged positions, a trip part positionable for alternative movement along a first or second path for movement of said clutch member, a first dog adapted during movement of said support to move said trip part when the trip part is positioned for movement in either of said paths, and a second dog adapted during movement of said support to move said trip part only when the trip part is positioned for movement in said first path.

2. In a machine tool the combination of a reciprocable support, transmission mechanism therefor including a clutch member shiftable to engaged and disengaged positions, a trip part alternatively positionable for movement along a first or a second path for movement of said clutch member, a dog having a first beveled portion adapted during support movement in the one direction to move said trip part only when said trip part is positioned for movement in said first path, said dog having another beveled portion adapted during support movement in the other direction to move said trip part from the one to the other of said paths.

3. In a machine tool the combination of a support having a reciprocatory cycle of movement, transmission mechanism therefor including a reverser having a member shiftable to opposite positions respectively effective for opposite directions of support movement and to an intermediate disengaged position, a trip part connected for movement with said member and a dog adapted at an intermediate point in the one direction of support movement to move said trip part to a position corresponding to the intermediate position of said clutch member, said trip part having another movement not connected for the movement of said clutch to enable the trip part to be moved to avoid said dog, and said dog being adapted in the other direction of support movement to effect the last mentioned movement of the trip part.

In witness whereof we have hereto affixed our signatures.

JOSEPH B. ARMITAGE.
RALPH E. SAVING.